United States Patent [19]
Kuzuya et al.

[11] Patent Number: 5,746,189
[45] Date of Patent: May 5, 1998

[54] EGR GAS ASSIST INJECTION SYSTEM FOR INTERNAL COMBUSTION ENGINE

[75] Inventors: Yoshihumi Kuzuya; Kimitaka Saito, both of Nagoya; Hitoshi Shibata, Okazaki, all of Japan

[73] Assignee: Nippon Soken, Inc., Nishio, Japan

[21] Appl. No.: 725,549

[22] Filed: Oct. 3, 1996

[30] Foreign Application Priority Data

Oct. 3, 1995 [JP] Japan .................... 7-256390

[51] Int. Cl.$^6$ .................................................. F02M 25/07
[52] U.S. Cl. ............................................ 123/568; 123/571
[58] Field of Search ................................ 123/568, 569, 123/570, 571

[56] References Cited

U.S. PATENT DOCUMENTS

| | | | |
|---|---|---|---|
| 4,361,126 | 11/1982 | Knapp et al. | 123/568 |
| 4,463,740 | 8/1984 | Sagisaka et al. | 123/568 |
| 4,628,888 | 12/1986 | Duret | 123/568 |
| 5,325,828 | 7/1994 | Yamaguchi et al. | 123/571 |

FOREIGN PATENT DOCUMENTS

| | | |
|---|---|---|
| 5-209561 | 8/1993 | Japan . |
| 7-007551 | 2/1995 | Japan . |

*Primary Examiner*—Willis R. Wolfe
*Attorney, Agent, or Firm*—Cushman Darby & Cushman IP Group of Pillsbury Madison & Sutro LLP

[57] ABSTRACT

An EGR (Exhaust Gas Recirculation) gas assist injection system for an internal combustion engine is provided which includes fuel injectors, sub-exhaust valves, and EGR valves. Each of the sub-exhaust valves is mechanically opened in synchronization with the start of an exhaust process of a corresponding one of engine cylinders. Each of the EGR valves is electrically opened to supply part of exhaust gas discharged through one of the subexhaust valves from one of the engine cylinders which is in the exhaust process to mix it with fuel sprayed into another of the engine cylinders which is in an intake process for promoting atomization of the fuel spray and achieving EGR.

20 Claims, 5 Drawing Sheets

EGR GAS ASSIST INJECTION SYSTEM FOR INTERNAL COMBUSTION ENGINE

BACKGROUND OF THE INVENTION

1. Technical Field of the Invention

The present invention relates generally to an EGR (Exhaust Gas Recirculation) gas assist injection system which may be employed in a spark ignition internal combustion engine into which fuel is injected at a relatively lower pressure, and more particularly to an EGR gas assist injection system which includes a combination of a fuel injection system and an EGR system.

2. Background of Related Art

An EGR system is well known in the art wherein a part of exhaust emissions discharged from an exhaust passage of an internal combustion engine is recirculated to an intake passage and then injected into combustion chambers along with air to decrease the combustion temperature for reducing the amount of $NO_x$ contained in the exhaust emissions. Additionally, air blast (also called air assist) fuel injectors which spray fuel pressurized as highly as possible from injection nozzles and eject pressurized air from around the injection nozzles to mix it with the fuel spray for promoting atomization of the fuel spray have also been suggested.

Japanese Patent First Publication No. 5-209561 discloses an EGR system for direct injection diesel engines which includes a reservoir chamber storing therein a part of exhaust emissions discharged from combustion chambers of the engine, an EGR passage connecting the reservoir chamber to fuel injectors for supplying as EGR gas the exhaust emissions within the reservoir chamber to the outside of injection nozzles of the fuel injectors, and a valve disposed within the EGR passage. The valve selectively opens and closes the EGR passage under control of a control circuit in synchronization with fuel injection timing to eject the EGR gas only around fuel spray from the fuel injectors for lowering the combustion temperature effectively with a small amount of the EGR gas.

Japanese Utility Model Second Publication No. 7-7551 teaches a multi-cylinder diesel engine designed to supply a part of air compressed in one of engine cylinders to another. Specifically, combustion chambers of the engine cylinders communicate with each other through a passage. The passage is selectively opened and closed by a valve to supply part of air compressed within one of the engine cylinders which is in a compression process to another which is in an expansion process. This step increases the amount of air during the expansion process and to promote the flow of air within the combustion chambers for reducing the amount of $NO_x$ contained in exhaust emissions and smoke.

In a typical EGR system, a part of exhaust emissions withdrawn from an exhaust passage is merely recirculated to an intake passage and then delivered to a combustion chamber of each engine cylinder, thus resulting in a difference in amount of EGR gas supplied to each engine cylinder. Additionally, after being mixed with air uniformly, the EGR gas is mixed with fuel spray. An increase in rate of the EGR thus causes the combustion temperature to be decreased to restrict $NO_x$ from being produced; however, the EGR gas mixed with an air-fuel mixture causes combustion conditions of fuel to be degraded, resulting in incomplete combustion leading to an increase in concentration of exhaust smoke.

Further, the EGR system taught in the above publication No. 5-209561 requires an additional structure including the reservoir chamber within which a part of exhaust emissions withdrawn from one of engine cylinders in an expansion process is stored for supplying it to the same engine cylinder as EGR gas at the end of a compression process. Additionally, the reservoir chamber needs to store the exhaust emissions for a long period of time from the latter half of the expansion process to the end of the compression process through exhaust and intake processes, thereby causing the exhaust emissions stored within the reservoir chamber to be cooled. This causes various substances contained in the exhaust emissions to be deposited and stuck to inner walls of the reservoir chamber and the passage, opening portions of the valve, or EGR gas injection nozzles formed in the fuel injectors, resulting in resistance to the flow of air, erosion of the inner walls of the reservoir chamber and the passage, malfunction of the valve, or blockades of the injection nozzles of the fuel injectors.

SUMMARY OF THE INVENTION

It is therefore a principal object of the present invention to avoid the disadvantages of the prior art.

According to one aspect of the present invention, there is provided an EGR gas assist injection system for an internal combustion engine. The EGR gas assist injection system includes a fuel injector for spraying fuel from an injection nozzle for fuel supply an to engine cylinder of the engine, and the fuel injector has an EGR gas nozzle. The EGR gas assist injection system further includes an EGR means for recirculating a part of exhaust gasses discharged from one of the engine cylinders which is in an exhaust process to the EGR gas nozzle to mix the part of exhaust gas with the fuel sprayed from the injection nozzle of the fuel injector into another one of the engine cylinders which is in an intake process.

In a preferred mode of the invention, the EGR means includes exhaust gas valves each disposed in one of cylinder heads of the engine cylinders, communicating with the EGR gas nozzle of the fuel injector through an exhaust passage. The EGR means further includes EGR valves disposed within portions of the exhaust passage communicating with combustion chambers of the engine cylinders through the exhaust gas valves, respectively, for selectively establishing and blocking supply of the part of the exhaust gas to the EGR gas nozzle of the fuel injector.

The EGR means may alternatively include exhaust gas valves each disposed in one of exhaust passages communicating with the engine cylinders, connected to the EGR gas nozzle of the fuel injector. The EGR means may also include EGR valves each disposed within one of the exhaust passages for selectively establishing and blocking communication between one of the exhaust gas valves and the EGR gas nozzle of the fuel injector.

The fuel injector is designed to inject the fuel directly into the combustion chambers of the engine cylinders.

The fuel injector may alternatively be designed to inject the fuel into an intake passage communicating with the combustion chambers of the engine cylinders.

According to another aspect of the invention, there is provided an EGR gas assist injection system for an internal combustion engine. The EGR gas assist injection system includes fuel injectors provided one for each of engine cylinders of the engine for spraying fuel from injection nozzles for fuel supply to the engine cylinders, the fuel injectors having EGR gas nozzles, respectively, and exhaust valves communicating between combustion chambers of the engine cylinders and the EGR gas nozzles of the fuel injectors through exhaust passages, respectively. The EGR gas assist injection system further includes EGR valves disposed within the exhaust passages for selectively establishing and blocking communications between the exhaust valves and the EGR gas nozzles of the fuel injectors, respectively, and a control means for controlling operations of the EGR valves. The control means opens one of the EGR valves for supplying a part of exhaust gasses discharged from one of the engine cylinders which is in an exhaust process to the EGR gas nozzle of one of the fuel injectors to mix the part of exhaust gas with the fuel sprayed from the injection nozzle of the one of the fuel injectors into another of the engine cylinders which is in an intake process.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
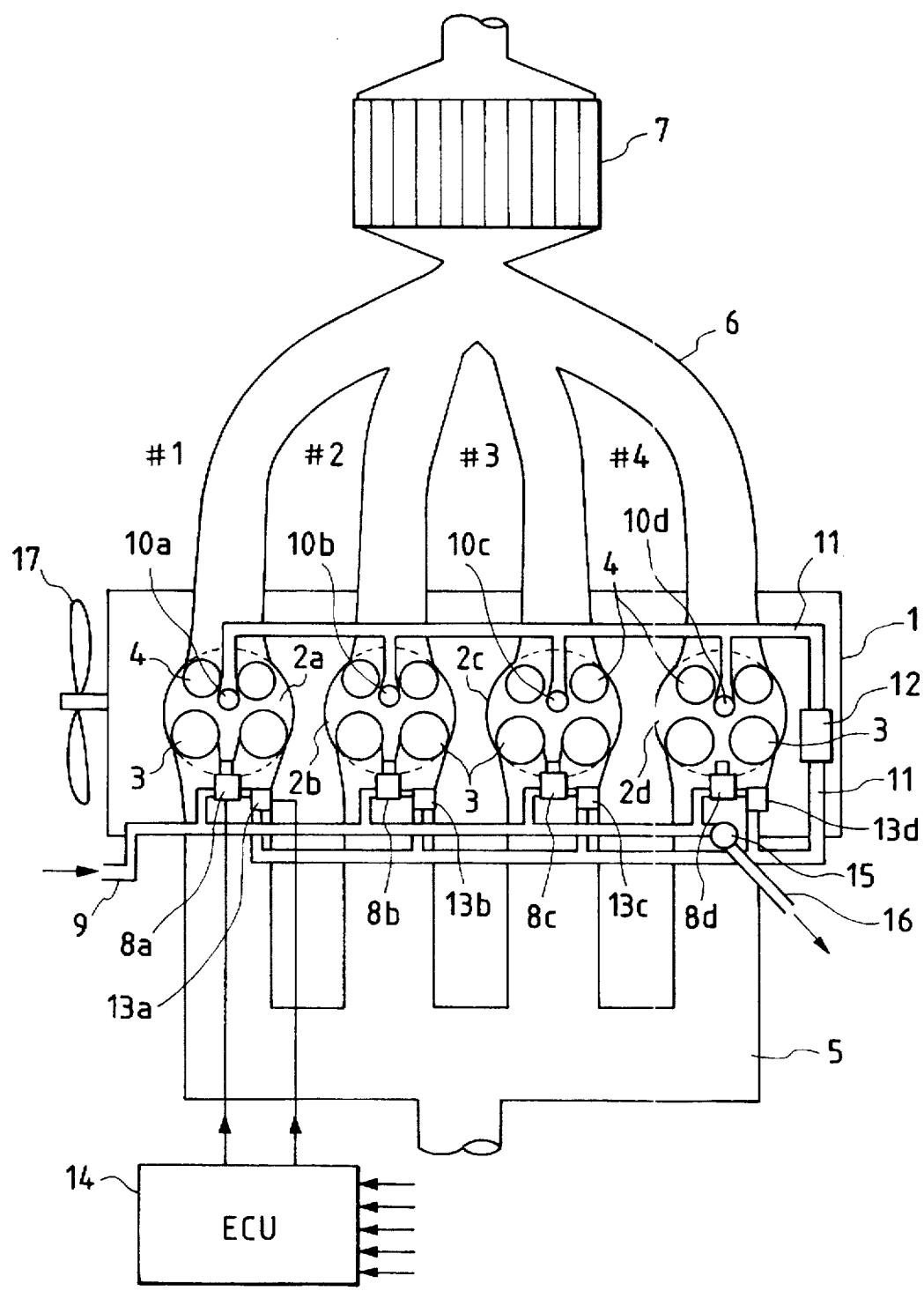
FIG. 1 is a plan view which shows a structure of an EGR gas assist system according to the present invention.

Referring now to the drawings, particularly to FIG. 1, there is shown an EGR gas assist injection system according to one of the preferred embodiments the present invention.

Figure 2:
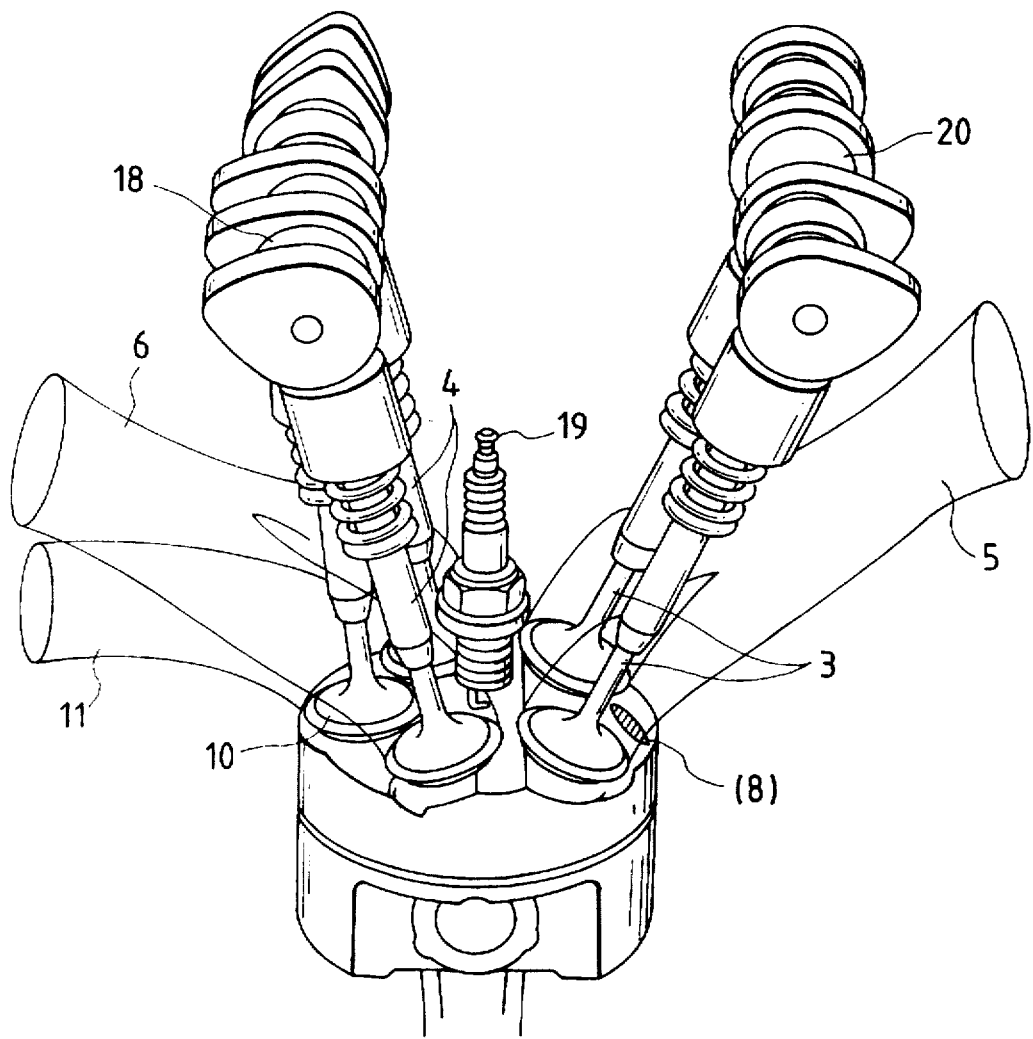
FIG. 2 is a partially perspective view which shows valve arrangements for each engine cylinder of the EGR gas assist system shown in FIG. 1.

An internal combustion engine 1, as shown, is a cylinder injection spark ignition engine wherein fuel is injected directly into engine cylinders. The engine 1 includes of four engine cylinder 2a to 2d (sometimes referred to using symbols #1 to #4 in the following discussion). In a cylinder head of each of the engine cylinders 2a to 2b, two intake valves 3 and two exhaust valves 4 are, as shown in FIG. 2, installed. All the intake valves 3 are moved by a camshaft 20 and communicates with an intake passage (not shown) through an intake manifold 5, while all the exhaust valves 4 are moved by a camshaft 18 and communicate with an exhaust emission control system 7 through an exhaust manifold 6.

Fuel injectors 8a to 8d (generally referred to using numeral 8) which are, as will be described later in detail, designed to spray fuel directly into the combustion chambers at a relatively lower pressure are installed in the engine cylinders 2a to 2d, respectively. A high-pressure fuel passage 9 connects with each of the fuel injectors 8a to 8d through branch pipes for supplying fuel pressurized by a fuel injection pump (not shown) thereto.

Sub-exhaust valves 10a to 10d are, as clearly shown in FIG. 2, disposed in the engine cylinders 2a to 2d one in each near the exhaust valves 4. Each of the sub-exhaust valves 10a to 10d is opened by rotation of the camshaft 18 substantially in synchronization with opening of the two exhaust valves 4 of corresponding one of the engine cylinders 2a to 2d or a given crank angle early. Valve openings of the sub-exhaust valves 10a to 10d communicate with a common exhaust gas line 11 which extends, as shown in FIG. 1, through a filter 12 to EGR valves 13a to 13d disposed within intake passages connected to the engine cylinders 2a to 2d, respectively. The EGR valves 13a to 13d are connected, as described later in detail, to EGR gas inlet ports of the fuel injectors 8a to 8d, respectively.

An electronic control unit (ECU) 14, equipped with a computer, receives sensor signals indicative of engine operating conditions such as the speed of the engine 1, the degree of opening of a throttle valve, a crank angle, an angular position of the camshaft 18, and the amount of intake air to provide control signals to the EGR valves 13a to 13d and the fuel injectors 8a to 8d for controlling on-off operations thereof.

A pressure regulator 15 is installed in the high-pressure fuel passage 9 to regulate the pressure of fuel flowing therethrough. The fuel spilt from the pressure regulator 9 is returned to a reservoir (not shown) through a passage 16. A cooling fan 17 is mounted in front of the engine 1. Spark plugs 19, as show in FIG. 2, are installed in the engine cylinders 2a to 2d, respectively.

Figure 3:
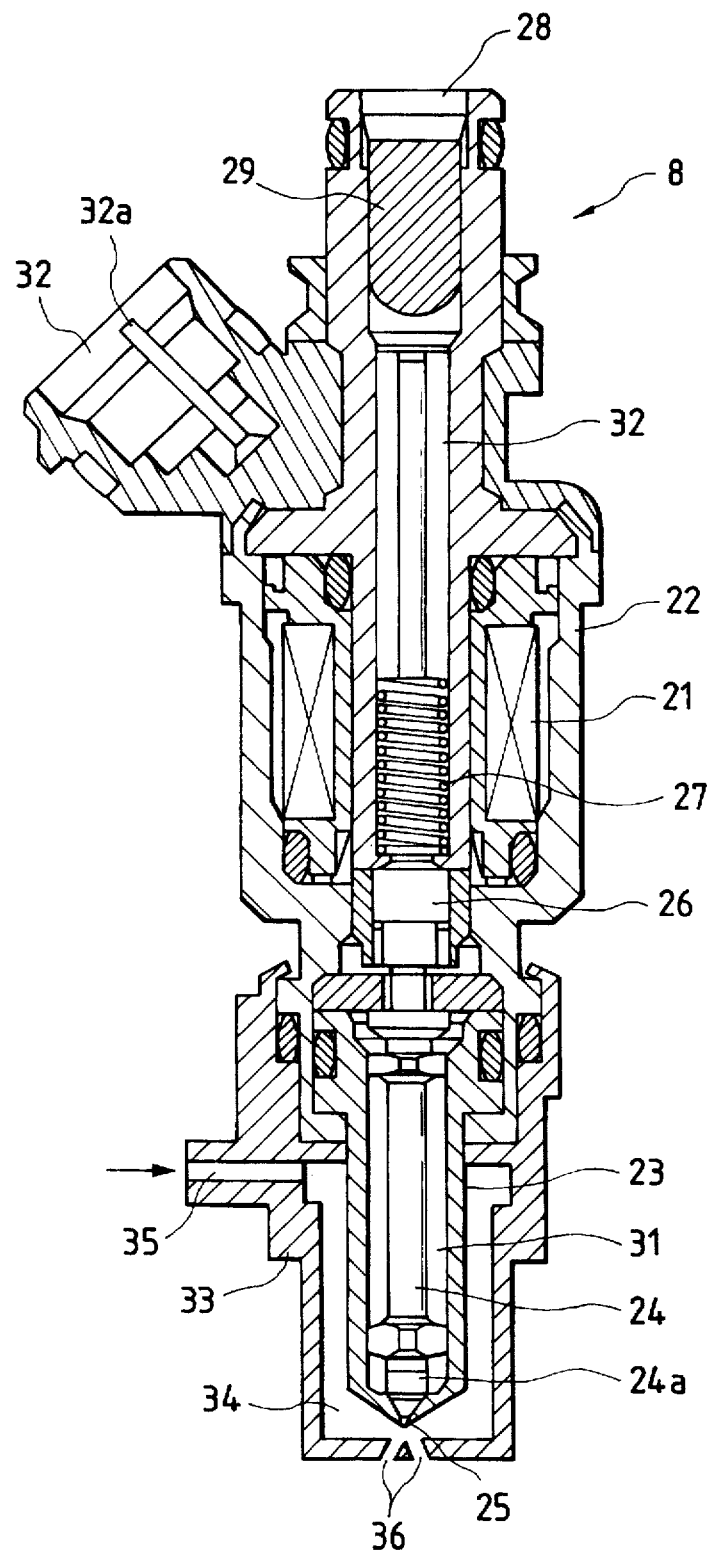
FIG. 3 is a vertical cross sectional view which shows an internal structure of a fuel injector.

FIG. 3 shows an internal structure of the fuel injector 8.

The fuel injector 8 includes generally a body 22 having disposed therein a solenoid 21 and a nozzle body 23. A needle 24 is disposed within the nozzle body 23 to be slidable vertically, as viewed in the drawing, within a given range for bringing a conical valve head 24a into and out of engagement with an injection hole 25 formed in the nozzle body 24. The needle 24 is connected at its upper end to a magnetic plunger 26 which is urged downward at all times by a coil spring 27 to bring the valve head 24a into constant engagement with the injection hole 25. The opening of the injection hole 25 is accomplished by turning on the solenoid 21 to attract the plunger 26, lifting the needle 24 upward.

A high-pressure fuel inlet 28 is formed in the body 22 which connects with the high-pressure fuel passage 9. The high-pressure fuel inlet 28 communicates with the injection hole 25 through a strainer 29 made of a mesh for filtering the fuel entering through the inlet 28, a fuel passage 30 formed in the body 22, and a fuel passage 31 formed in the nozzle body 23. A connector 32 made of a heat-resistant resin material is disposed within the body 22 which establishes electric connection between the ECU 14 and the solenoid 21 through an electrode 32a.

The fuel injector 8 also includes an EGR assist body 33 covering the nozzle body 23. The EGR assist body 33 defines between an inner wall thereof and the nozzle body 23 an EGR gas passage 34 communicating with an EGR gas inlet port 35 through which the EGR gas discharged from each of the EGR valves 13a to 13d is supplied. The EGR assist body 33 also has formed in a central portion of an end thereof a plurality of mixture holes 36 for ejecting a mixture of the EGR gas and fuel sprayed from the injection hole 25.

Figure 4:
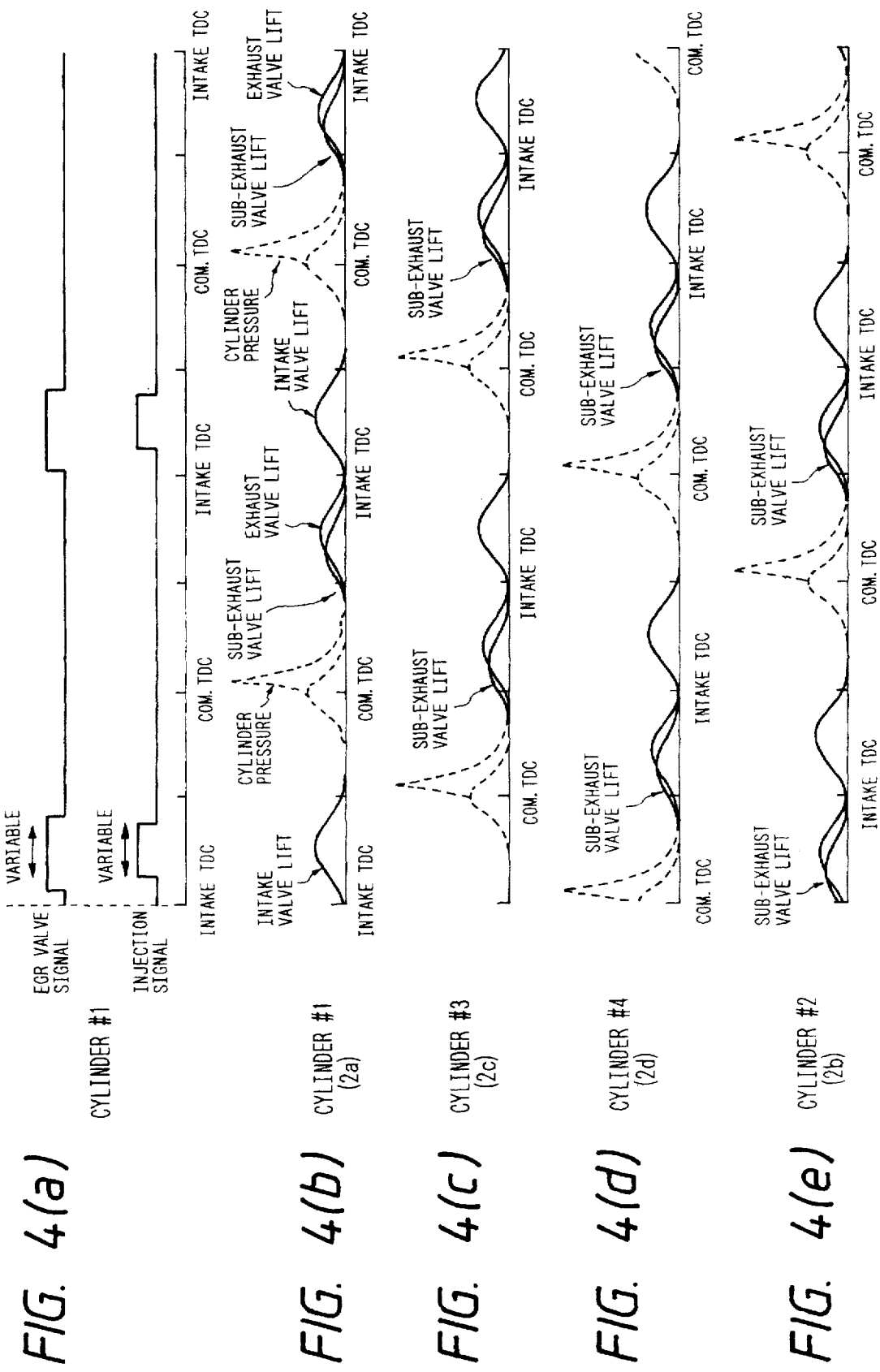
FIG. 4(a) is a time chart which shows an EGR valve signal and an injection signal provided during engine process.
FIGS. 4(b) to 4(e) are time charts which show valve lift operations in engine cylinders #1 to #4, respectively.

In operation, assuming that the spark plugs 19 are turned on in sequence to start the expansion process in order of the engine cylinder #1 to #4, the exhaust process of the engine cylinder #1, as shown in FIG. 4(b), starts simultaneously with the intake process of the engine cylinder #3, the exhaust process of the engine cylinder #3, as shown in FIG. 4(c), starts simultaneously with the intake process of the engine cylinder #4, the exhaust process of the engine cylinder #4, as shown in FIG. 4(d), starts simultaneously with the intake process of the engine cylinder #2, and the exhaust process of the engine cylinder #2, as shown in FIG. 4(e), starts simultaneously with the intake process of the engine cylinder #1.

The valve timing of each of the sub-exhaust valves 10a to 10d is determined so as to open substantially in synchronization with or slightly earlier than the start of the exhaust process of a corresponding one of the engine cylinders #1 to #4. For example, the sub-exhaust valve 10a of the engine cylinder #1 is controlled to be opened simultaneously with the start of the exhaust process of the engine cylinder #1. Simultaneously, the EGR valve 13c of the engine cylinder #3 is opened under control of the ECU 14 in synchronization with the opening of the sub-exhaust valve 10a of the engine cylinder #1. This causes a part of burned gasses within the combustion chamber of the engine cylinder #1 whose piston is on the exhaust stroke to be supplied as the EGR gas through the exhaust gas line 11 and the filter 12 to the EGR gas inlet 35 of the fuel injector 8c of the engine cylinder #3 whose piston is on the intake stroke.

The EGR gas entering the EGR gas inlet 35 of the fuel injector 8c then flows through the EGR gas passage 34 and is injected from the mixture holes 36 into the combustion chamber of the engine cylinder #3. Upon the injection of the EGR gas, the ECU 14 provides a control signal to the solenoid 21 of the fuel injector 8c to lift up the needle 24 to open the injection hole 25, thereby spraying the fuel supplied to the high-pressure inlet 28 under, for example, 30 atmospheres from the injection hole 25. The fuel spray is then mixed with the EGR gas discharged from the mixture holes 36 which is, in turn, diffused within the combustion chamber. This promote atomization of the fuel spray.

The amount of EGR gas depends upon the length of time each of the EGR valves 13a to 13d is opened under control of the ECU 14. The ECU 14 thus controls the time during which each of the EGR valves 13a to 13d is opened based on an engine operating condition determined using the engine speed, the degree of opening of the throttle valve, the coolant temperature, a crank angle, an angular position of the camshaft, and/or a specific volume of intake air for optimizing the amount of EGR gas and also opens each of the fuel injectors 8a to 8d with optimum timing determined based on the engine operating condition.

Figure 5:
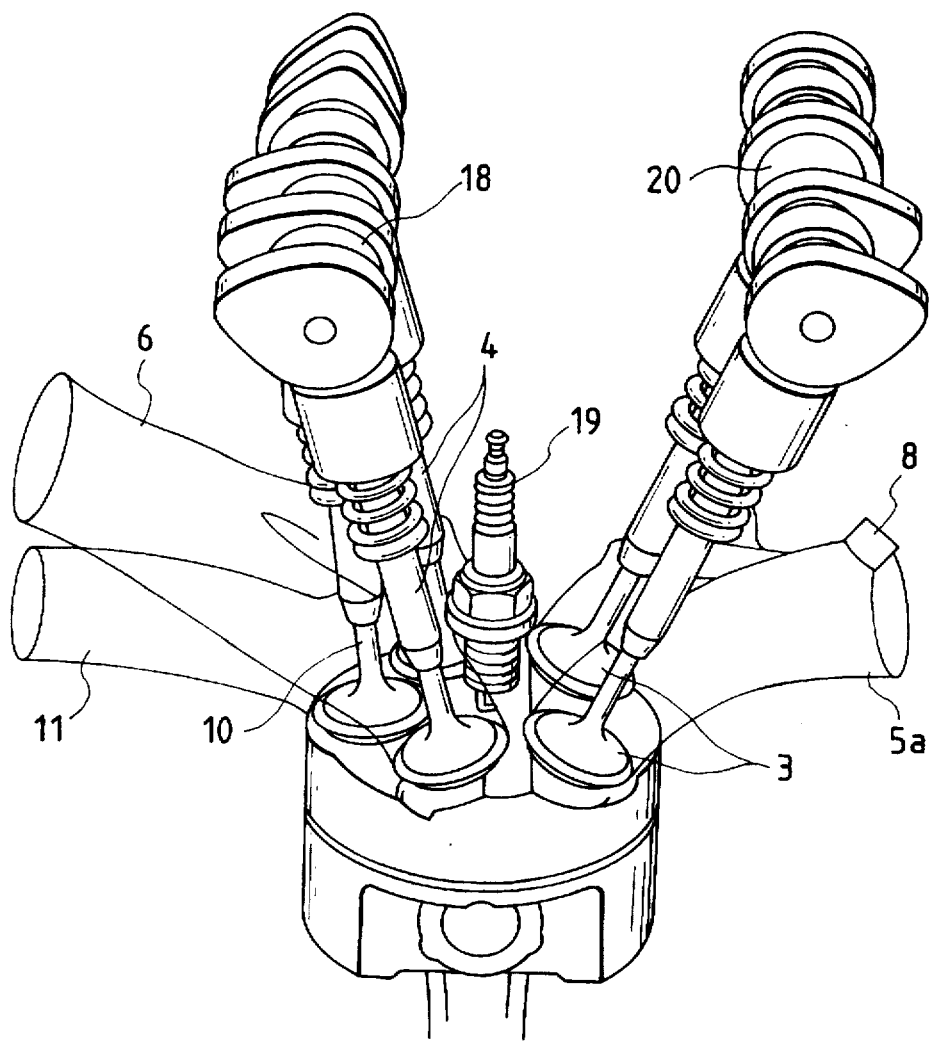
FIG. 5 is a perspective view which shows a spark ignition engine of the type different from the cylinder injection engine as shown in FIG. 2.

FIG. 5 shows a spark ignition engine of the type different from the cylinder injection engine as used in the above first embodiment with which the EGR gas assist injection system of the invention may be used.

As clearly shown in the drawing, the fuel injector 8 is installed in a branch intake passage 5a of the intake manifold 5 communicating with the combustion chamber of each of the engine cylinders 2a to 2d. Alternatively, a single fuel injector may be disposed in a common intake passage upstream of branch passages each communicating with one of the engine cylinders 2a to 2d.

While in the shown engine, the sub-exhaust valve 10 is disposed between the exhaust valves 4 on the cylinder head, an EGR valve may be mounted either in an exhaust port to which one of the exhaust valves 4 is connected or in one of branch pipes of the exhaust manifold 6 downstream of the exhaust port. In this case, the pressure of the EGR gas flowing through the EGR valve becomes equivalent to the pressure of exhaust gas which is lower than the pressure of EGR gas directly drawn from the engine cylinders as in the above discussed embodiments. During the intake process of the engine in the absence of a turbocharger, the intake manifold 5 in which the fuel injector 8 is installed and the combustion chambers will be under negative pressures, respectively. Thus, as long as the exhaust gas is at a positive pressure, a pressure difference is produced which serves to eject the EGR gas from the mixture holes 36 formed in the EGR gas passage 34 of the fuel injector 8.

While the present invention has been disclosed in terms of the preferred embodiments in order to facilitate a better understanding thereof, it should be appreciated that the invention can be embodied in various ways without departing from the principles of the invention. Therefore, the invention should be understood to include all possible embodiments and modifications to the shown embodiments which can be embodied without departing from the principles of the invention as set forth in the following claims.

What is claimed is:

1. An EGR gas assist injection system for an internal combustion engine comprising:

a fuel injector for spraying fuel from an injection nozzle to supply fuel to engine cylinders of the engine, said fuel injector having an EGR gas nozzle; and EGR means for recirculating a part of exhaust gasses discharged from a port formed in a cylinder head of one of the engine cylinders which is in an exhaust process to the EGR gas nozzle to mix the part of exhaust gasses with the fuel sprayed from the injection nozzle of said fuel injector into another of the engine cylinders which is in an intake process.

2. An EGR gas assist injection system as set forth in claim 1, wherein said EGR means includes exhaust gas valves each disposed in one of cylinder heads of the engine cylinders, communicating with the EGR gas nozzle of said fuel injector through an exhaust passage.

3. An EGR gas assist injection system as set forth in claim 2, wherein said EGR means further includes EGR valves disposed within portions of an exhaust passage communicating with combustion chambers of the engine cylinders through the exhaust gas valves, respectively, for selectively establishing and blocking supply of the part of the exhaust gasses to the EGR gas nozzle of said fuel injector.

4. An EGR gas assist injection system as set forth in claim 1, wherein said EGR means includes exhaust gas valves each disposed in one of exhaust passages communicating with the engine cylinders, connected to the EGR gas nozzle of said fuel injector.

5. An EGR gas assist injection system as set forth in claim 4, wherein said EGR means further includes EGR valves each disposed within one of the exhaust passages for selectively establishing and blocking communication between one of the exhaust gas valves and the EGR gas nozzle of said fuel injector.

6. An EGR gas assist injection system as set forth in claim 1, wherein said fuel injector injects the fuel directly into combustion chambers of the engine cylinders.

7. An EGR gas assist injection system as set forth in claim 1, wherein said fuel injector injects the fuel into an intake passage communicating with combustion chambers of the engine cylinders.

8. An EGR gas assist injection system for an internal combustion engine comprising:

fuel injectors provided one for each of engine cylinders of the engine for spraying fuel from injection nozzles for fuel supply to the engine cylinders, said fuel injectors having EGR gas nozzles, respectively;

exhaust valves communicating between combustion chambers of the engine cylinders and the EGR gas nozzles of said fuel injectors through exhaust passages, respectively;

EGR valves disposed within the exhaust passages for selectively establishing and blocking communications between said exhaust valves and the EGR gas nozzles of said fuel injectors, respectively; and control means for controlling operations of said EGR valves, said control means opening one of said EGR valves for supplying part of exhaust gas discharged from one of the engine cylinders which is in an exhaust process to the EGR gas nozzle of one of said fuel injectors to mix the part of exhaust gas with the fuel sprayed from the injection nozzle of the one of said fuel injectors into another of the engine cylinders which is in an intake process.

9. An EGR gas assist injection system for an internal combustion engine comprising:

a fuel injector for spraying fuel from an injection nozzle to supply fuel to engine cylinders of the engine;

an EGR gas nozzle being formed in said fuel injector; and

EGR means for recirculating a part of exhaust gasses discharged from a port formed in a cylinder head of one of the engine cylinders which is in an exhaust process to the EGR gas nozzle to mix the part of exhaust gasses with the fuel sprayed from the injection nozzle into another of the engine cylinders.

10. An EGR gas assist injection system as set forth in claim 9, wherein said EGR means includes exhaust gas valves each disposed in one of cylinder heads of the engine cylinders, communicating with the EGR gas nozzle of said fuel injector through an exhaust passage.

11. An EGR gas assist injection system as set forth in claim 9, wherein said EGR means further includes EGR valves disposed within portions of an exhaust passage communicating with combustion chambers of the engine cylinders through the exhaust gas valves, respectively, for selectively establishing and blocking supply of the part of the exhaust gasses to the EGR gas nozzle of said fuel injector.

12. An EGR gas assist injection system as set forth in claim 9, wherein said EGR means includes exhaust gas valves each disposed in one of exhaust passages communicating with the engine cylinders, connected to the EGR gas nozzle of said fuel injector.

13. An EGR gas assist injection system as set forth in claim 9, wherein said EGR means further includes EGR valves each disposed within one of the exhaust passages for selectively establishing and blocking communication between one of the exhaust gas valves and the EGR gas nozzle of said fuel injector.

14. An EGR gas assist injection system as set forth in claim 9, wherein said fuel injector injects the fuel directly into combustion chambers of the engine cylinders.

15. An EGR gas assist injection system as set forth in claim 9, wherein said fuel injector injects the fuel into an intake passage communicating with combustion chambers of the engine cylinders.

16. An EGR gas assist injection system for an internal combustion engine comprising:

a fuel injector for spraying fuel from an injection nozzle to supply fuel to engine cylinders of the engine, said fuel injector having an EGR gas nozzle;

EGR means for recirculating a part of exhaust gasses discharged from one of the engine cylinders which is in an exhaust process to the EGR gas nozzle to mix the part of exhaust gasses with the fuel sprayed from the injection nozzle of said fuel injector into another of the engine cylinders which is in an intake process; and wherein said EGR means includes exhaust gas valves each disposed in one of cylinder heads of the engine cylinders, communication with the EGR gas nozzle of said fuel injector through an exhaust passage.

17. An EGR gas assist injection system as set forth in claim 16, wherein said EGR means further includes EGR valves disposed within portions of an exhaust passage communicating with combustion chambers of the engine cylinders through an exhaust gas valves, respectively, for selectively establishing and blocking supply of the part of the exhaust gasses to the EGR gas nozzle of said fuel injection.

18. An EGR gas assist injection system for an internal combustion engine comprising:

a fuel injector for spraying fuel from an injection nozzle to supply fuel to engine cylinders of the engine, said fuel injector having an EGR gas nozzle;

EGR means for recirculating a part of exhaust gasses discharged from one of the engine cylinders which is in an exhaust process to the EGR gas nozzle to mix the part of exhaust gasses with the fuel sprayed from the injection nozzle of said fuel injector into another of the engine cylinders which is in an intake process; and wherein said EGR means includes exhaust gas valves each disposed in one of exhaust passages communicating with the engine cylinders, connected to the EGR gas nozzle of said fuel injector.

19. An EGR gas assist injection system as set forth in claim 18, wherein said EGR means further includes EGR valves each disposed within one of the exhaust passages for selectively establishing and blocking communication between one of the exhaust gas valves and the EGR gas nozzle of said fuel injector.

20. An EGR gas assist injection system for an internal combustion engine comprising:

a fuel injector for spraying fuel from an injection nozzle to supply fuel to engine cylinders of the engine, said fuel injector having an EGR gas nozzle;

EGR means for recirculating a part of exhaust gasses discharged from one of the engine cylinders which is in an exhaust process to the EGR gas nozzle to mix the part of exhaust gasses with the fuel sprayed from the injection nozzle of said fuel injector into another of the engine cylinders which is in an intake process; and wherein said fuel injector injects the fuel directly into combustion chambers of the engine cylinders.

* * * * *